United States Patent
Golov (10) Patent No.: US 11,734,131 B2
(45) Date of Patent: Aug. 22, 2023

(54) MEMORY DEVICE HAVING REDUNDANT MEDIA MANAGEMENT CAPABILITIES

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/844,289

(22) Filed: Apr. 9, 2020

(65) Prior Publication Data

US 2021/0318937 A1    Oct. 14, 2021

(51) Int. Cl.
*G06F 11/00* (2006.01)
*G06F 11/14* (2006.01)

(52) U.S. Cl.
CPC .... G06F 11/1489 (2013.01); *G06F 2201/805* (2013.01)

(58) Field of Classification Search
CPC ............ G06F 11/2092; G06F 11/2089; G06F 11/2097; G06F 11/20; G06F 11/2025; G06F 9/505; G06F 11/184; G06F 12/1483; G06F 2201/805; G06F 11/1489
See application file for complete search history.

(56) References Cited

U.S. PATENT DOCUMENTS

| | | | | |
|---|---|---|---|---|
| 5,922,077 A * | 7/1999 | Espy | ................... | G06F 11/2094 714/4.12 |
| 6,108,684 A * | 8/2000 | DeKoning | .............. | G06F 9/505 718/100 |
| 6,247,099 B1 * | 6/2001 | Skazinski | ........... | G06F 12/0815 711/117 |
| 6,279,078 B1 * | 8/2001 | Sicola | ................. | G06F 11/1666 711/119 |
| 6,732,289 B1 * | 5/2004 | Talagala | .............. | G06F 11/2092 714/6.3 |
| 7,219,260 B1 * | 5/2007 | de Forest | ............ | G06F 11/1474 714/15 |
| 7,472,221 B1 * | 12/2008 | Cartmell | ............. | G06F 11/2069 711/104 |
| 7,814,293 B2 * | 10/2010 | Schnapp | ............. | G06F 11/2089 711/202 |
| 8,159,935 B1 * | 4/2012 | Fritz | ................... | H04L 67/1034 370/220 |

(Continued)

OTHER PUBLICATIONS

International Search Report and Written Opinion, PCT/US2021/026244, dated Jul. 26, 2021.

*Primary Examiner* — Loan L. T. Truong
(74) *Attorney, Agent, or Firm* — Greenberg Traurig (57) ABSTRACT

Methods, systems, and apparatuses related to multiple instructions sets or redundant instructions for memory access and management. In one approach, a controller of the memory device provides a first set of functions for management of a storage media of the memory device. The controller uses the first set of functions to service one or more requests received from the host device. The controller provides a second set of functions for management of the storage media. The second set includes one or more functions that are redundant to the first set. When a request is received from the host device, in response to determining that the first set of functions is unavailable to service the request, the controller services the request using one or more of the redundant functions of the second set.

16 Claims, 4 Drawing Sheets

(56) References Cited

U.S. PATENT DOCUMENTS

| | | | |
|---|---|---|---|
| 9,436,399 B2 | 9/2016 | Garson et al. | |
| 10,346,220 B2* | 7/2019 | Liu | G06F 9/526 |
| 10,698,818 B2* | 6/2020 | McKean | G06F 12/0246 |
| 2003/0126347 A1* | 7/2003 | Tan | G06F 11/2097 |
| | | | 710/313 |
| 2003/0158999 A1* | 8/2003 | Hauck | G06F 12/0866 |
| | | | 711/120 |
| 2003/0159082 A1* | 8/2003 | Brant | G06F 12/0866 |
| | | | 711/E12.019 |
| 2003/0200389 A1* | 10/2003 | Odenwald, Jr. | G06F 11/2097 |
| | | | 711/E12.019 |
| 2003/0200398 A1* | 10/2003 | Harris | G06F 11/2097 |
| | | | 711/163 |
| 2004/0199812 A1* | 10/2004 | Earl | G06F 11/1446 |
| | | | 714/13 |
| 2006/0259650 A1* | 11/2006 | Chou | G06F 3/0658 |
| | | | 710/8 |
| 2007/0002847 A1* | 1/2007 | Inamura | G06F 11/2092 |
| | | | 370/360 |
| 2007/0006015 A1* | 1/2007 | Rao | G06F 11/2028 |
| | | | 714/4.1 |
| 2009/0207515 A1* | 8/2009 | Cideciyan | G11B 20/1201 |
| | | | 360/31 |
| 2009/0217021 A1* | 8/2009 | Goodson | G06F 9/45558 |
| | | | 713/1 |
| 2009/0276654 A1* | 11/2009 | Butterworth | G06F 11/182 |
| | | | 714/1 |
| 2011/0313580 A1* | 12/2011 | Bakhmach | G05B 9/03 |
| | | | 700/292 |
| 2012/0047506 A1 | 2/2012 | Maes | |
| 2013/0047029 A1* | 2/2013 | Ikeuchi | G06F 11/14 |
| | | | 714/6.22 |
| 2013/0054913 A1* | 2/2013 | Maeda | G06F 11/1092 |
| | | | 711/162 |
| 2013/0086336 A1* | 4/2013 | Canepa | G06F 3/0688 |
| | | | 711/154 |
| 2014/0143854 A1* | 5/2014 | Lopez | H04L 63/0218 |
| | | | 726/14 |
| 2014/0244876 A1* | 8/2014 | Colpo | G06F 11/221 |
| | | | 710/200 |
| 2014/0258608 A1* | 9/2014 | Viswanatha | G06F 3/0673 |
| | | | 711/113 |
| 2014/0351526 A1 | 11/2014 | Peterson | |
| 2015/0052385 A1* | 2/2015 | Galbraith | G06F 11/2097 |
| | | | 714/6.3 |
| 2015/0113254 A1 | 4/2015 | Tannenbaum et al. | |
| 2015/0227442 A1* | 8/2015 | Baddourah | G06F 11/2007 |
| | | | 714/4.2 |
| 2015/0347245 A1* | 12/2015 | Andre | G06F 11/203 |
| | | | 714/6.3 |
| 2016/0011909 A1* | 1/2016 | Nemoto | G06F 11/3433 |
| | | | 718/104 |
| 2016/0043919 A1* | 2/2016 | Connelly | H04L 41/28 |
| | | | 709/220 |
| 2016/0103698 A1* | 4/2016 | Yang | G06F 11/2048 |
| | | | 718/1 |
| 2016/0231939 A1* | 8/2016 | Cannata | G06F 3/0605 |
| 2016/0352564 A1* | 12/2016 | Sanda | H04L 41/0663 |
| 2017/0083415 A1* | 3/2017 | Reza | G06F 11/1425 |
| 2017/0249223 A1* | 8/2017 | Sherlock | G06F 11/2092 |
| 2018/0046507 A1 | 2/2018 | Borlick et al. | |
| 2018/0082575 A1* | 3/2018 | El-Mankabady | H04L 67/12 |
| 2018/0089044 A1* | 3/2018 | Guim Bernat | G06F 12/1425 |
| 2018/0165194 A1* | 6/2018 | McKean | G06F 3/06 |
| 2018/0367412 A1* | 12/2018 | Sethi | H04L 41/40 |
| 2020/0272354 A1* | 8/2020 | Chou | G06F 3/0635 |
| 2021/0081287 A1* | 3/2021 | Koning | H04L 67/1097 |

* cited by examiner

MEMORY DEVICE HAVING REDUNDANT MEDIA MANAGEMENT CAPABILITIES

FIELD OF THE TECHNOLOGY

At least some embodiments disclosed herein relate to memory devices in general, and more particularly, but not limited to a memory device having redundant capabilities for managing a storage media of the memory device.

BACKGROUND

Various types of non-volatile storage devices can be used to store data. Non-volatile storage devices can include NAND flash memory devices. NAND flash is a type of flash memory constructed using NAND logic gates. Alternatively, NOR flash is a type of flash memory constructed using NOR logic gates. Currently, the use of NAND flash predominates the flash market.

Typical computer storage devices have controllers that receive data access requests from host devices and perform programmed computing tasks to implement the requests in ways that may be specific to the media and structure configured in the storage devices. In one example, a flash memory controller manages data stored in flash memory and communicates with a computer device. In some cases, flash memory controllers are used in solid-state drives for use in mobile devices, or in SD cards or similar media for use in digital cameras.

Firmware can be used to operate a flash memory controller for a particular storage device. In one example, when a computer system or device (e.g., a host device) reads data from or writes data to a flash memory device, it communicates with the flash memory controller.

Typically, a flash memory controller includes a flash translation layer (FTL) that maps logical block addresses (LBAs) received from a host device to physical addresses of flash memory. By doing so, the FTL provides a logical-to-physical mapping.

In typical flash memories, NAND or NOR transistors are used to store information and are arranged in arrays or grids of gates accessible via bit and word lines, the intersection of which is referred to as a cell. The simplest flash memories store one bit of information per cell and are referred to as single-level cell (SLC) flash memories. In contrast, in triple-level cell (TLC) flash memories, for example, each cell stores three bits of information.

BRIEF DESCRIPTION OF THE DRAWINGS

The embodiments are illustrated by way of example and not limitation in the figures of the accompanying drawings in which like references indicate similar elements.

DETAILED DESCRIPTION

The following disclosure describes various embodiments for a memory device that has redundant capabilities for managing a storage media. At least some embodiments herein relate to a memory device (e.g., a NAND flash device) that stores data in a non-volatile storage media. In one example, the memory device may store data used by a host device (e.g., a computing device of an autonomous vehicle, or another computing device that accesses data stored in the memory device). In one example, the memory device is a solid-state drive mounted in an electric-powered vehicle.

In prior memory devices, storage media management is often time sensitive. For example, if a media playback device or application cannot service media requests quickly enough, the media playback is interrupted and becomes choppy. Users typically find interrupted and choppy media playback performance to be unacceptable. Buffers possibly might be used mitigate performance problems due to delays or blockages in media playback processing by allowing commands to be queued up for processing. However, if commands arrive faster than they can be processed by the memory device due to blockages or delays in processing, and the buffer is not large enough, commands will still be lost, resulting in choppy playback. In some cases, fairly large buffers might possibly help mitigate playback interruptions. However, it can be costly to implement such large buffers.

Various embodiments of the present disclosure provide a technological solution to one or more of the above technical problems. In one embodiment, a method implemented by a controller of a memory device comprises: providing a first set of functions for management of a storage media (e.g., for a TLC NAND flash device) of the memory device, wherein the controller uses the first set of functions to service requests from a host device; providing a second set of functions for management of the storage media, wherein a redundant function of the second set is redundant to one or more functions of the first set; receiving a first request from the host device; determining whether the first set of functions is available to service the first request; and in response to determining that the first set of functions is unavailable to service the first request, servicing the first request using the redundant function of the second set.

In one embodiment, the first set of functions and/or the second set of functions can include one of more of various capabilities that are implemented by the controller. In one example, these capabilities include one or more of decoding commands, retrieving blocks of media from memory, decoding retrieved media blocks, and/or formatting decoded media for output, etc.

In one embodiment, two or more sets of redundant media management capabilities (e.g., sets of media management functions) are configured in a memory device, such that when one set of media management capabilities is busy in handling error, maintenance, and/or other activities, another set of media management capabilities can continue to service data access requests being received from a host device, without a need for an increased-size buffer to accept and hold the requests and/or associated data received from the host device.

In one embodiment, the controller of a memory device implements a media management approach that provides one or more alternate paths (e.g., path(s) provided using a second set of functions, including one or more redundant functions) for servicing media requests (e.g., from a host device) when the primary path (e.g., a path provided using a first set of primary functions used in a normal or default mode) is busy or blocked. This allows for smooth and continuous media management without requiring very large buffers.

For example, if the primary media path hits an error with a corrupted or invalid command, the primary media path may be delayed while it tries to correct the error. With one or more alternate media paths being made available from servicing requests using redundant functions as described herein, incoming commands can continue to be processed by being routed to an alternate processing path while the primary path is busy. In other examples, this approach can also be applied to other aspects of media management. For example, media encoding and storage can run faster when multiple processing paths are made available by providing redundant function servicing as described herein.

In various embodiments, the redundant function approach above can be used in a wide range of media processing devices and applications. For example, media playback devices such as DVD, CD, and MP3 players and burners, and computer applications that manage media recording and playback can benefit from this approach.

In one embodiment, first and/or second sets of functions are implemented by processing logic of the controller. For example, firmware of the controller can be executed to determine when to implement and use one or more redundant function(s) as described above.

Figure 1:
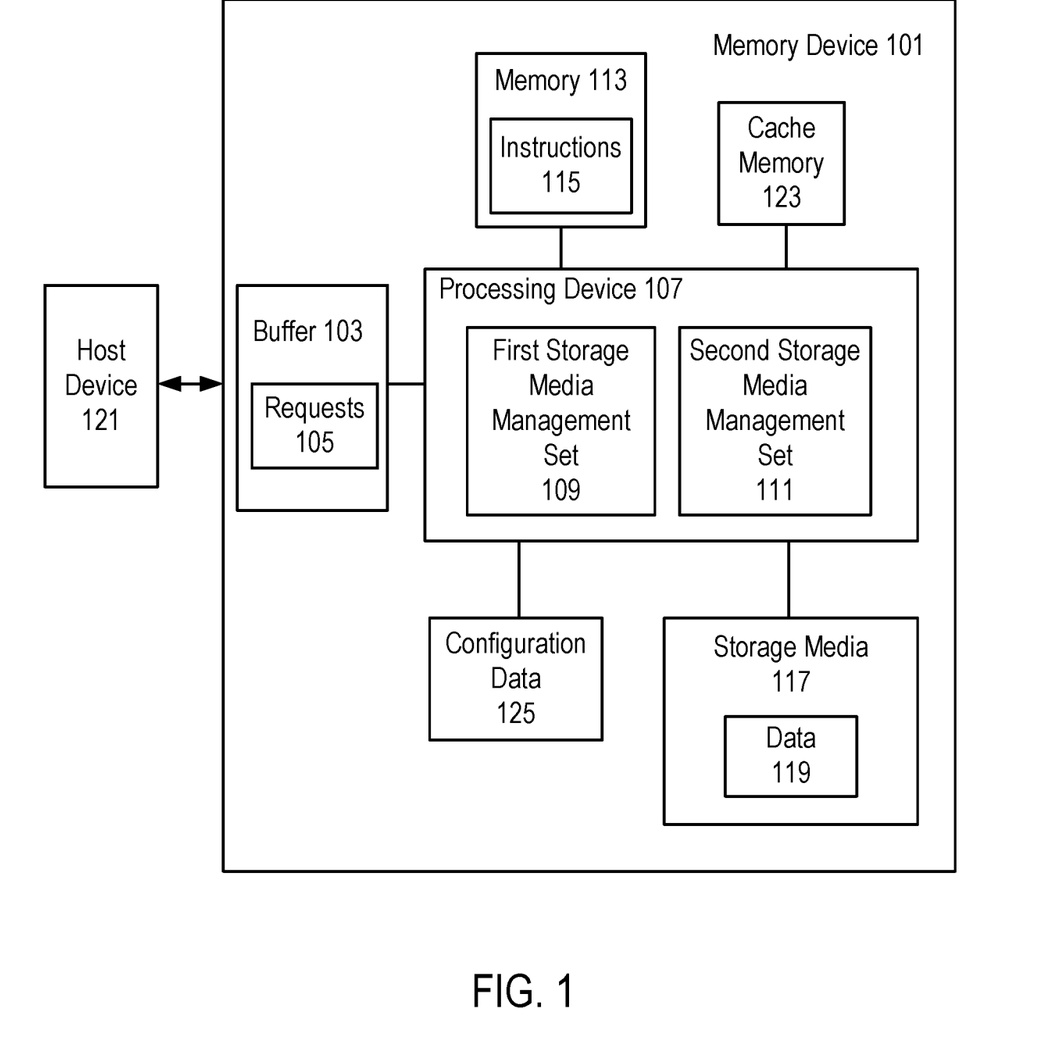
FIG. 1 shows a memory device for storing and retrieving media data, in accordance with some embodiments.

FIG. 1 shows a memory device 101 for storing and retrieving media data, in accordance with some embodiments. Examples of memory devices 101 may include media playback devices, such as DVD, CD and MP3 players, and media recording devices, such as DVD, CD and MP3 burning devices. Further examples of media devices include wirelessly-connected media devices, wireless media players, digital media players, streaming media boxes, network-connected media players, etc. Memory device 101 contains storage media 117, processing device 107 (e.g., a controller), memory 113 (e.g., volatile and/or non-volatile memory), and buffer 103.

Memory device 101 is connected to a host device 121. The host device may be, for example, a computer, television, or entertainment console. Memory device 101 receives requests 105 (e.g., a request to store, retrieve, and/or process media data) from the host device 121. Requests 105 from the host device 121 are put into a buffer 103 (e.g., DRAM or SRAM). The buffer 103 may queue up multiple requests from the host device 121 for subsequent processing by the processing device 107.

Processing device 107 retrieves and executes requests 105 from the buffer 103. Examples of processing devices 107 may include embedded processors, graphics processors, CPUs, ASICs, FPGAs, embedded computers, etc. Processing device 107 includes a first storage media management set 109 and a second storage media management set 111. The first storage media management set 109 contains a set of functions for storing, retrieving, and/or processing media data. For example, these functions may include capabilities such as encoding or decoding media data, storing and retrieving blocks of media data, formatting media data for output, etc.

The second storage media management set 111 also contains a set of functions for storing, retrieving or processing media data. At least some of the functions contained in the second storage media management set 111 are redundant functions also contained in the first storage media management set 109. For example, the first storage media management set 109 may be capable of performing all supported media management functions including encoding or decoding media data, storing and retrieving blocks of media data, formatting media data for output, etc. In one embodiment, the second storage media management set 111 may also be capable of performing all supported media management functions. In one embodiment, the second storage media management set 111 may support a subset of media management functions such as storing or retrieving blocks of data.

Sometimes processing requests 105 through the first storage media management set 109 may be delayed or blocked. For example, if the processing device 107 is servicing a request 105 using the first storage media management set 109 and there is an error (e.g., an invalid command was decoded, or there was a request for an invalid data block), further processing through the first storage media management set 109 may be blocked until the error has been handled. When processing through the first storage media management set 109 is blocked or delayed, requests 105 can be processed through the second storage media management set 111 to enable processor 107 to continue processing requests 105 while the first storage media management set 109 is handling the error.

In one example, processing logic of a controller is used to implement first set 109 and/or second set 111. In one example, a second controller can implement the second set 111.

In some embodiments, the first storage media management set 109 and the second storage media management set 111 may be used in parallel to speed up processing requests 105 or to increase memory device 101 throughput. Processing device may query a status of memory device 101 that is stored in configuration data 125 (e.g., stored in a register or memory). The status can be used as a basis for determining when to use sets 109 and 111 in parallel. Configuration data 125 can be set or updated when a determination is made to use redundant functions of second set 111 to handle one or more requests 105.

The memory device 101 includes storage media 117 for storing media data 119. Storage media 117, for example, may include non-volatile memory, such as flash memory (e.g., SLC, TLC, QLC, etc.), 3D XPoint memory, or removeable media, such as DVD, CD, or magnetic tape. Media data may include, for example, data blocks, files or streamed data containing video, audio, pictures, graphics or other media content.

Memory device 101 also includes memory 113. Memory 113 holds instructions 115 that processor 107 uses in processing requests 105. Memory 113 may include, for example, flash memory, 3D XPoint memory, DRAM, SRAM, etc. In one embodiment, the memory 113 is external to the processing device 107. In one embodiment, the memory 113 is embedded within the processing device 107.

In one embodiment, memory device 101 includes cache memory 123, which can store data being processed by processing device 107. In one example cache memory 123 holds data received from host device 121 while processing device 107 determines that redundant functions from second set 111 are needed to process the received data (e.g., data associated with a write request) (e.g., needed due to first set 109 not being available). In one example, cache memory 123 is DRAM or SRAM.

Figure 2:
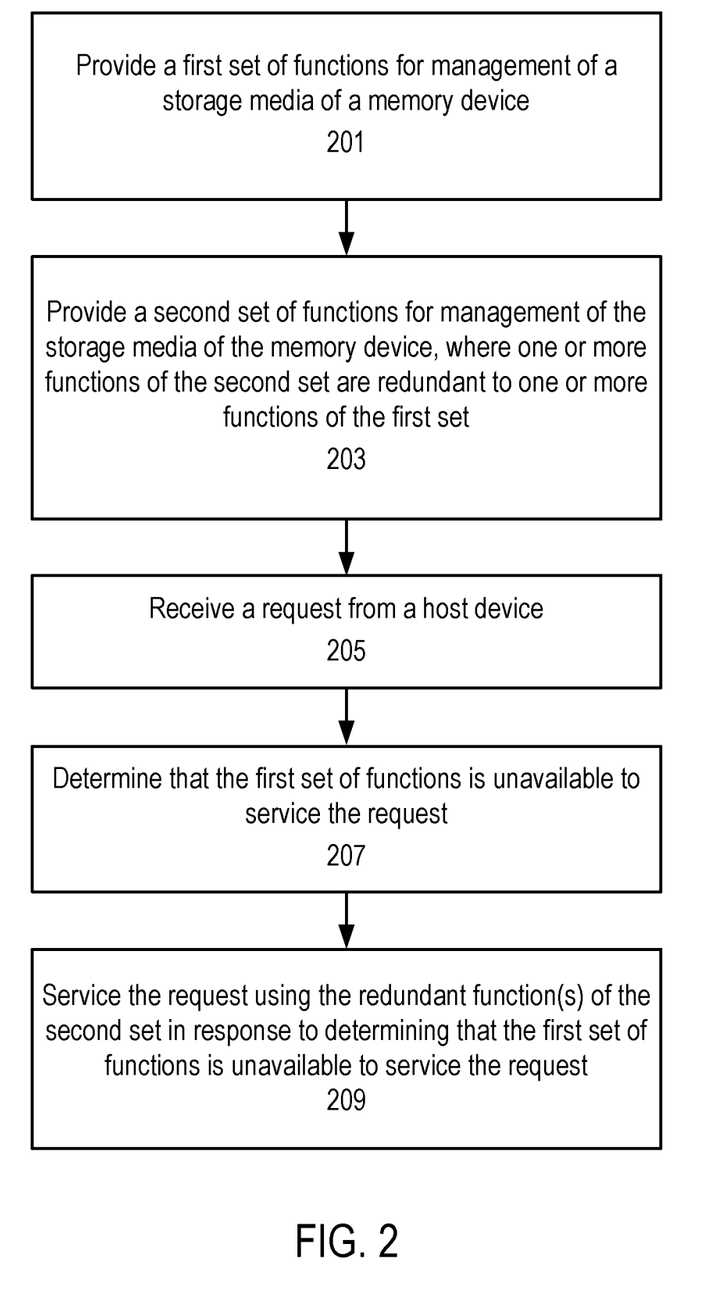
FIG. 2 shows a method for managing a storage media of a memory device, in accordance with some embodiments.

FIG. 2 shows a method for managing a storage media of a memory device, in accordance with some embodiments. For example, the method of FIG. 2 can be implemented in the system of FIG. 1. In one example, the memory device is memory device 101.

The method of FIG. 2 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 2 is performed at least in part by one or more processing devices (e.g., processing device 107 of FIG. 1). In one example, the processing device is a controller of a solid-state drive used in an autonomous vehicle. In one example, a host device sends requests to the solid-state drive, and the host device is a navigation or control system (e.g., steering or braking) of the autonomous vehicle.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 201, a first set of functions for management of a storage media of a memory device is provided. In one example, the first set of functions is first storage media management set 109. In one example, the storage media is storage media 117.

At block 203, a second set of functions for management of the storage media of the memory device is provided. One or more functions of the second set are redundant to one or more functions of the first set of functions. In one example, the second set of functions is second storage media management set 111.

At block 205, a request is received from host device. In one example, the request is one of requests 105. In one example, the host device is host device 121.

At block 207, a determination is made whether the first set of functions is available to service the request received from the host device. In one example, the determination is made by processing device 107. In one example, the determination is made based at least in part on determining that first set 109 is busy servicing a maintenance or error correction function associated with data 119 stored in storage media 117.

At block 209, in response to determining that the first set of functions is unavailable to service the request, the request is serviced using the one or more redundant functions of the second set. In one example, the one or more redundant functions include functions of processing device 107 related to writing data 119 to storage media 117. In one example, the redundant function is related to programming flash memory cells of a NAND flash storage media in memory device 101.

In one embodiment, a method for a memory device (e.g., memory device 101) comprises: providing, by a controller (e.g., processing device 107) of a memory device, a first set of functions (e.g., first set 109) for management of a storage media of the memory device, wherein the controller uses the first set of functions to service requests from a host device (e.g., host device 121); providing, by the controller, a second set of functions (e.g., second set 111) for management of the storage media, wherein a redundant function of the second set is redundant to one or more functions of the first set; receiving a first request from the host device; determining whether the first set of functions is available to service the first request; and in response to determining that the first set of functions is unavailable to service the first request, servicing the first request using the redundant function of the second set.

In one embodiment, the first request is a data access request (e.g., a request 105 to access data 119 stored in storage media 117).

In one embodiment, the first request is a command, and servicing the first request comprises decoding the command. In one example, the command is a read or write command.

In one embodiment, the method further comprises: in response to receiving the first request, retrieving a block of data from the storage media; wherein servicing the first request comprises decoding the retrieved block of data.

In one embodiment, the redundant function is an error function or a maintenance function. In one example, the maintenance function is associated with performing wear leveling for storage media 117 by processing device 107 using first set 109.

In one embodiment, the first request is a request to store first data in the storage media, the redundant function is a data processing function, and servicing the first request comprises using the data processing function to process the first data. In one example, the data processing function is decompressing and/or decoding data 119 using first set 109. In one example, second set 111 includes redundant functions of decompressing and/or decoding. In one example, data 119 is copied to cache memory 123 for the decompressing and/or decoding. In one example, a result from or a state of the decompressing and/or decoding is stored in configuration data 125.

In one embodiment, the method further comprises, in response to receiving the first request, queueing the first request in a buffer of the memory device. In one example, requests 105 received from host device 121 are queued in buffer 103. Processing device 107 services each request in the queue using first set 109 or second set 111 based at least in part on configuration data 125. In one example, an availability status of first set 109 is stored in configuration data 125. When servicing each request, processing device 107 checks the availability status for first set 109 in making a determination whether to use first set 109 or second set 111 to service the request. In one embodiment, when servicing each request, processing device 107 checks the availability status for first set 109 in making a determination whether first set 109 is available to service the request.

In one embodiment, the method further comprises, after servicing the first request using the redundant function, removing the first request from the buffer.

In one embodiment, the method further comprises: determining that an error exists in processing a prior request; and processing the error using the first set of functions. The first set of functions is determined to be unavailable due to determining that the first set of functions is busy processing the error.

In one embodiment, the method further comprises, in response to determining that the first set of functions is unavailable to service the first request, routing the first request for servicing by the second set of functions. In one example, the routing includes copying data associated with the request to cache memory 123.

In one embodiment, the method further comprises, while the first set of functions is unavailable due to servicing one or more requests received prior to new requests, routing the new requests for servicing by the second set of functions.

In one embodiment, the first request is a read command, and the first set of functions is unavailable to service the read command due to storing data in the storage media when the read command is received.

In one embodiment, the redundant function is decoding a command, retrieving a data block from the storage media, decoding a retrieved data block, or formatting decoded data for output.

In one embodiment, the first request is a write command associated with incoming data from the host device, and servicing the first request comprises processing the incoming data.

In one embodiment, a memory device comprises: a buffer; a storage media; at least one processing device; and memory containing instructions configured to instruct the at least one processing device to: provide a first set of functions for management of the storage media, wherein the first set of functions is used to service requests from a host device; provide a second set of functions for management of the storage media, wherein a redundant function of the second set is redundant to one or more functions of the first set; receive, in the buffer, a first request from the host device; determine whether the first set of functions is available to service the first request; and in response to determining that the first set of functions is unavailable to service the first request, service the first request using the redundant function of the second set.

In one embodiment, the first request is a request to store first data in the storage media, and servicing the first request comprises using the redundant function of the second set to process the first data.

In one embodiment, determining whether the first set of functions is available to service the first request comprises determining that the first set of functions is processing an error associated with a request received by the memory device from the host device prior to receiving the first request.

In one embodiment, the redundant function is decoding data received from the host device.

In one embodiment, a non-transitory computer storage medium (e.g., memory 113) stores instructions which, when executed on a computing device (e.g., memory device 101, or a system including memory device 101), cause the computing device to at least: provide a first set of functions for management of a storage media of a memory device, wherein the first set of functions is used to service requests from a host device; provide a second set of functions for management of the storage media, wherein a redundant function of the second set is redundant to one or more functions of the first set; receive a first request from the host device; determine whether the first set of functions is available to service the first request; and in response to determining that the first set of functions is unavailable to service the first request, service the first request using the redundant function of the second set.

In one embodiment, the instructions further cause the computing device to, in response to receiving the first request, queue the first request in a buffer of the memory device.

Figure 3:
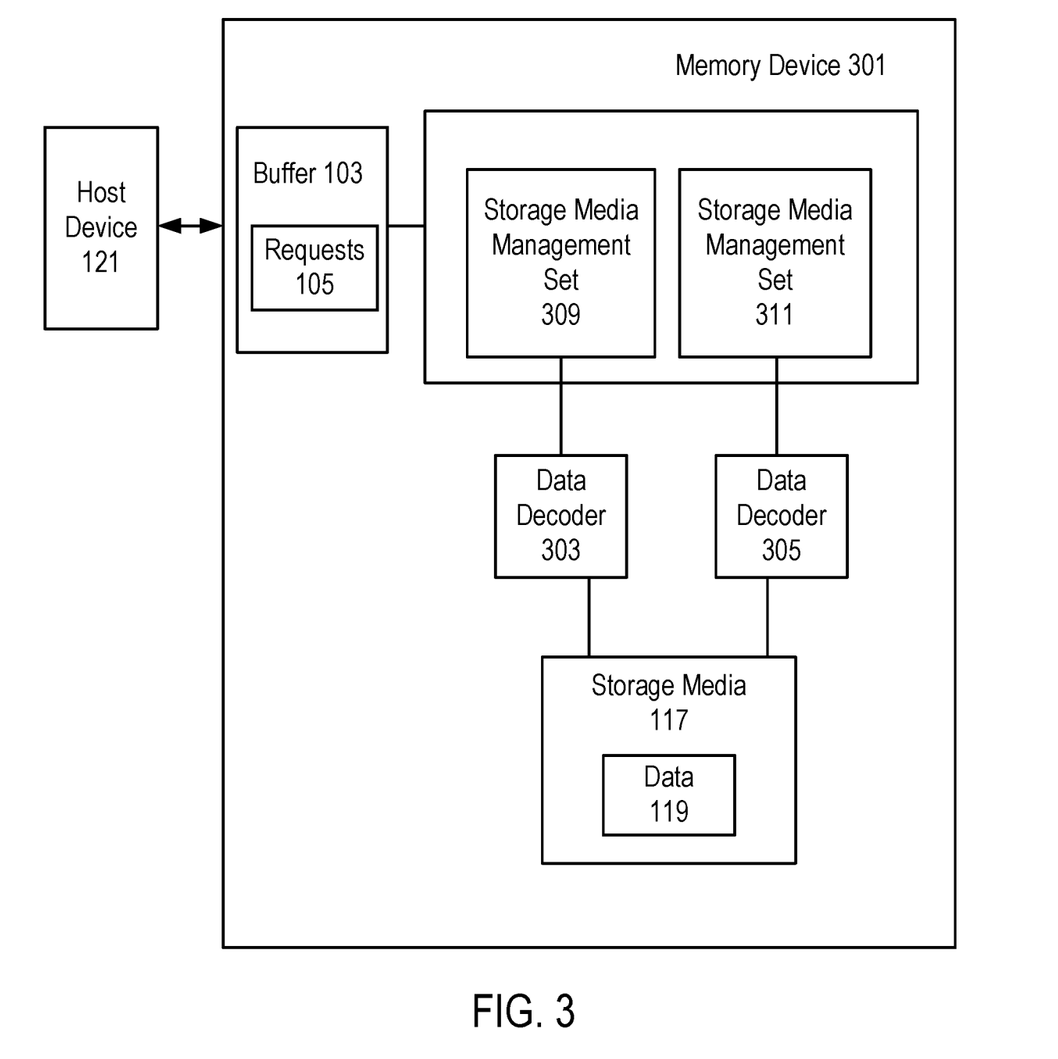
FIG. 3 shows a memory device for decoding and storing media data received from a host device, in accordance with some embodiments.

FIG. 3 shows a memory device 301 for decoding and storing media data received from a host device, in accordance with some embodiments. Memory device 301 receives data and commands from host device 121. This data and commands are received by buffer 103 and includes requests 105. In response to receiving request 105, data 119 is stored in storage media 117.

In response receiving a request 105, storage media management set 309 includes functionality for decoding data received from host device 121. The received data is decoded by data decoder 303 and then stored in storage media 117.

Storage media management set 311 provides redundant functionality for performing decoding of data received from host device 121. The received data is decoded by data decoder 305 and then stored in storage media 117. This functionality is redundant at least in part to the decoding functionality provided by storage media management set 309.

In one embodiment, when a request 105 is received from host device 121 to store data, a determination is made by memory device 301 that storage media management set 309 is busy processing an error associated with a prior request from host device 121. Thus, memory device 301 determines that storage media management set 309 is unavailable for handling the request received from host device 121. In response to determining that storage media management set 309 is unavailable, the received data is decoded by storage media management set 311 using data decoder 305. The decoded data is then stored in storage media 117.

Figure 4:
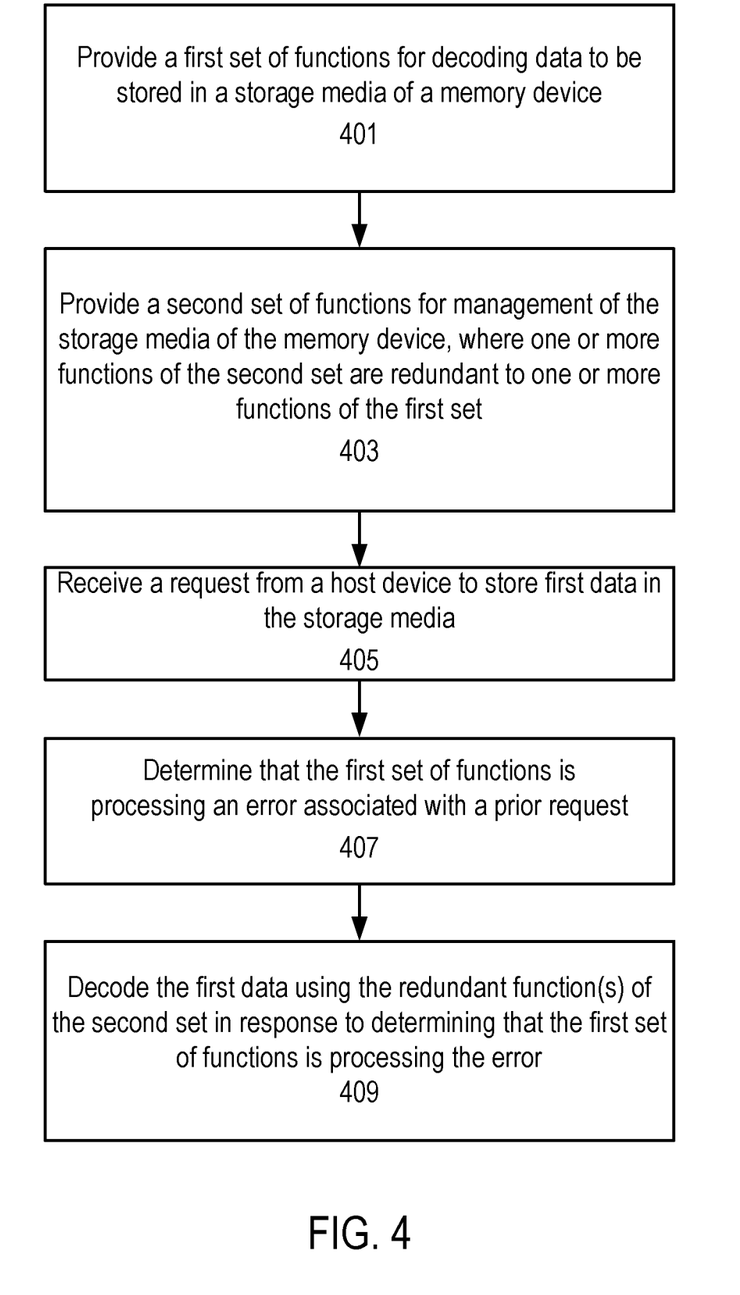
FIG. 4 shows a method for decoding and storing data in a storage media of a memory device, in accordance with some embodiments.

FIG. 4 shows a method for decoding and storing data in a storage media of a memory device, in accordance with some embodiments. For example, the method of FIG. 4 can be implemented in the system of FIG. 3. In one example, the memory device is memory device 301.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices. In one example, the processing device is a controller of a solid-state drive. In one example, a host device sends requests to the solid-state drive.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, a first set of functions is provided for decoding data to be stored in a storage media of a memory device. In one example, the decoded data is data 119. In one example, the storage media is storage media 117. In one example, the first set of functions is storage media management set 309.

At block 403, a second set of functions is provided for management of the storage media of the memory device. One or more functions of the second set are redundant to one or more functions of the first set. In one example, the second set of functions is storage media management set 311.

At block 405, request is received from a host device to store first data in the storage media. In one example, the host device is host device 121 and the request is a request 105.

At block 407, it is determined that the first set of functions is currently processing an error associated with a prior request (e.g., at the time the new request is received). In one example, the prior request is a previous command received from host device 121.

At block 409, the first data is decoded using the redundant function(s) of the second set in response to determining that the first set of functions is processing the error. In one example, the first data is decoded using data decoder 305.

The disclosure includes various devices which perform the methods and implement the systems described above, including data processing systems which perform these methods, and computer readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
providing a first decoding function in a memory device;
providing a second decoding function in the memory device, wherein the second decoding function is redundant to the first decoding function;
receiving by the memory device a first request from a host device;
queueing the first request in a buffer of the memory device;
determining by the memory device that the first decoding function is unavailable to service the first request due to processing by the first decoding function being delayed and based on an availability status of the first decoding function that is stored in configuration data of the memory device indicating that the first decoding function is unavailable to service the requests from the host device, and wherein the first decoding function is busy processing an error associated with a prior request received by the memory device from the host device prior to receiving the first request;
in response to determining that the first decoding function is unavailable to service the first request, servicing the first request using the redundant second decoding function; and
removing the first request from the buffer after servicing the first request using the redundant second decoding function.

2. The method of claim 1, wherein the first request is a data access request.

3. The method of claim 1, wherein the first request is a command, and servicing the first request comprises decoding the command.

4. The method of claim 1, further comprising:
in response to receiving the first request, retrieving a block of data from the storage media;
wherein servicing the first request comprises decoding the retrieved block of data.

5. The method of claim 1, further comprising:
while the first decoding function is unavailable due to servicing one or more requests received prior to new requests, routing the new requests for servicing to the second decoding function.

6. A memory device comprising:
a buffer;
a storage media;
at least one processing device; and
memory containing instructions configured to instruct the at least one processing device to:
provide a first set of functions to the memory device for management of the storage media, wherein the first set of functions is used to service requests from a host device, the requests to retrieve data from the storage media or to decode data;
provide a second set of functions to the memory device for management of the storage media, wherein a redundant function of the second set is redundant to one or more functions of the first set, wherein the redundant function comprises retrieving data from the storage media, and wherein the first set of functions and the second set of functions are used in parallel to process the requests;
receive a first request from the host device;
execute the first request by the first set of functions;
receive a second request from the host device during the execution of the first request;
determine that the first set of functions is unavailable to service the second request due to processing the first request by the first set of functions, wherein determining that the first set of functions is unavailable to service the second request comprises determining that the first set of functions is busy processing an error associated with the first request received by the memory device from the host device prior to receiving the second request; and
in response to determining that the first set of functions is unavailable to service the first request, service the second request using the redundant function of the second set.

7. The memory device of claim 6, wherein the first request is a request to read first data in the storage media, and servicing the first request comprises using the redundant function of the second set to process the first data.

8. The memory device of claim 6, wherein determining that the first set of functions is unavailable to service the first request comprises determining that the first set of functions is processing an error associated with the first request received by the memory device from the host device prior to receiving the second request.

9. The memory device of claim 6, wherein the redundant function further comprises decoding data received from the host device.

10. A memory device storing instructions which, when executed, cause the memory device to at least:
provide a first set of functions for management of a storage media of the memory device, wherein the first set of functions is used to service requests from a host device, the requests to retrieve data from the storage media or to decode data;

provide a second set of functions for management of the storage media, wherein a redundant function of the second set is redundant to one or more functions of the first set;

receive a first request from the host device;

execute the first request by the first set of functions;

determine that an error exists in processing the first request;

process the error using the first set of functions;

receive a second request from the host device during the execution of the first request;

determine that the first set of functions is unavailable to service the second request due to processing the first request by the first set of functions, wherein the first set of functions is determined to be unavailable due to determining that the first set of functions is busy processing the error; and in response to determining that the first set of functions is unavailable to service the second request, service the second request using the redundant function of the second set.

11. The memory device of claim 10, wherein the instructions further cause the memory device to, in response to receiving the first request, queue the first request in a buffer of the memory device.

12. The memory device of claim 10, wherein the instructions further cause the memory device to:

queue the second request in a buffer of the memory device; and remove the second request from the buffer after servicing the second request using the redundant function.

13. The memory device of claim 10, wherein the redundant function further comprises an error function or a maintenance function.

14. The memory device of claim 10, wherein the first request is a request to read first data in the storage media, the redundant function further comprises a data processing function, and servicing the first request comprises using the data processing function to process the first data.

15. The memory device of claim 10, wherein the instructions further cause the memory device to:

determine that an error exists in processing the first request; and process the error using the first set of functions, wherein the first set of functions is determined to be unavailable due to determining that the first set of functions is busy processing the error.

16. The memory device of claim 10, wherein the redundant function further comprises retrieving a data block from the storage media, and decoding the retrieved data block.

* * * * *